United States Patent [19]
Miwa et al.

[11] Patent Number: 5,997,032
[45] Date of Patent: Dec. 7, 1999

[54] SEAT WITH SIDE AIR BAG

[75] Inventors: Kazuya Miwa; Takeshi Awano; Mikiharu Shimoda, all of Okazaki; Junichi Nakamura, Anjo, all of Japan

[73] Assignee: Mitsubishi Jidosha Kogyo Kabushiki Kaisha, Tokyo, Japan

[21] Appl. No.: 09/042,567

[22] Filed: Mar. 17, 1998

[30] Foreign Application Priority Data

Mar. 17, 1997 [JP] Japan ................................. 9-062912

[51] Int. Cl.$^6$ ................................................. B60R 21/22
[52] U.S. Cl. ................................ 280/730.2; 280/730.1
[58] Field of Search ............................ 280/730.2, 730.1, 280/728.1

[56] References Cited

U.S. PATENT DOCUMENTS

| | | | |
|---|---|---|---|
| 5,498,030 | 3/1996 | Hill et al. | 280/730.2 |
| 5,799,971 | 9/1998 | Asada | 280/730.2 |
| 5,816,610 | 10/1998 | Higashiara et al. | 280/728.3 |
| 5,845,932 | 12/1998 | Kimura et al. | 280/730.2 |
| 5,860,673 | 1/1999 | Hasegawa et al. | 283/730.2 |
| 5,863,063 | 1/1999 | Harrell | 280/730.2 |
| 5,893,579 | 4/1999 | Kimura et al. | 280/730.2 |

FOREIGN PATENT DOCUMENTS

| | | |
|---|---|---|
| 768215 | 4/1997 | European Pat. Off. . |
| 4-50052 | 2/1992 | Japan . |
| 97 42062 | 11/1997 | WIPO . |

*Primary Examiner*—Christopher P. Ellis

[57] ABSTRACT

A seat with a side air bag for a motor vehicle is provided with an air bag module that includes an inflator and an air bag, and is incorporated in a seat back portion of the seat. The air bag is inflated to fill a space between an occupant and a side wall of the vehicle. The seat further includes a first skin member covering each side face of the seat back portion, and a second skin member covering a front face of the seat back portion. The second skin member is sewed to one end of the first skin member. A reinforcing member is provided on at least a part of a rear surface of the first skin member, for controlling a direction in which the air bag expands out of the seat back portion.

18 Claims, 6 Drawing Sheets

PRIOR ART

PRIOR ART

SEAT WITH SIDE AIR BAG

FIELD OF THE INVENTION

The present invention relates to a seat for a motor vehicle provided with a side air bag, wherein an air bag module is incorporated in a seat back portion of the vehicle seat. In particular, this invention is concerned with such a seat with a side air bag that ensures high expanding or inflating capability of the side air bag.

BACKGROUND OF THE INVENTION

In recent years, air bags have been widely used as safety measures of automobiles. In particular, one type of air bag has been remarkably spreading which expands or inflates from the front side of an occupant during an impact on an automobile in its longitudinal (front-to-back) direction, so as to absorb shocks when the occupant is thrown toward a front panel or windshield. Subsequently, another type of air bag, called a side impact air bag (or side air bag), has been developed and already used in practice. This type of air bag is adapted to expand from one side of an occupant, to absorb shocks when the occupant is thrown toward a vehicle body or door on the above one side of the occupant.

The side air bag, as described above, is inflated to fill the space between the side body of the automobile and the occupant during the side impact, to absorb shocks between the side body and the occupant. Due to a considerably short distance between the side body and the occupant, this type of air bag is required to deploy with a higher response to a side impact, as compared with the above-described air bag for an impact in the longitudinal direction of the automobile. Also, the side air bag needs to expand toward an appropriate position of the vehicle, to ensure sufficient absorption of shocks on the occupant.

In a structure as disclosed in Japanese laid-open Patent Publication No. 4-50052, for example, a side air bag is provided at a side portion of a seat back, and the position of an inflator including a detonating agent is determined so that the side air bag, when inflated during an impact, is guided in a suitable direction. In this structure, the seat back is formed with an opening through which the side air bag expands outward, and a lid is provided to cover this opening.

In the prior art structure, however, the opening, through which the side air bag expands outward, is normally closed by the lid, and the lid provided on the surface of the seat back is exposed to the outside of the seat, and may deteriorate the appearance of the seat.

Also, the lid is formed of a material that is significantly different in texture from that of a skin or cover of the seat back, which may be formed of a resin material, for example. Thus, the lid cannot be provided on the front face of the seat that makes contact with a body of the occupant, and is consequently provided on the side face of the seat. Accordingly, the opening, through which the side air bag expands outward, is also formed through the side face of the seat back, and the direction of expansion of the side air bag is limited due to the position of the opening.

In view of the above situation, it is desired to provide a structure wherein the side air bag is incorporated within the seat back without using such a lid, so that the side air bag can be appropriately inflated when the vehicle receives an impact.

FIG. 10 is a cross-sectional view showing a known example of a seat for an automobile that is provided with a side air bag, wherein the side air bag is incorporated in the seat back, without providing a lid on a side face of the seat back. This figure shows a cross section as viewed in the direction of arrow A—A in FIG. 9.

As shown in FIG. 9 and FIG. 10, a seat back frame (hereinafter, simply called a "frame") 3 is provided inside a seat back 2 of a seat 1 for an automobile, and an air bag module 11 is attached to this frame 3. While the seat with a side air bag as shown in FIG. 10 is used as a left-side seat of the vehicle, a similar structure symmetrical with this seat may be provided as a right-side seat.

The air bag module 11 includes an inflator 12, and a folded air bag body 13. During an impact on the vehicle, a detonating agent (not shown) explodes, and gas is supplied from the inflator 12 into the air bag body 13, to unfold and inflate the air bag body 13.

During the vehicle impact, a skin 4 of the seat back 2 must be torn to allow the air bag body 13 to expand outwardly of the seat back 2. Further, the air bag body 13 is required to be inflated to fill the space between the side body of the automobile and the occupant to absorb a shock due to a collision between the side body and the occupant. Namely, the air bag body 13 is desired to deploy and expand into an area (inflation area) as indicated by hatched lines in FIG. 10, for example.

In the example shown in FIG. 10, the seat back skin 4 includes a front cloth 4A covering a seating surface on the front side of the seat, a back cloth 4B covering the rear face of the seat back 2, and a side cloth 4C covering each side face of the seat back 2, which cloths 4A, 4B, 4C are sewed together. For example, the air bag body 13 is constructed to expand outwardly of the seat back while rupturing a seam 4D formed between the front cloth 4A and the side cloth 4C.

In the example of FIG. 10 in which the front cloth 4A and side cloth 4C are sewed together, the side cloth 4C itself may be torn before the seam 4D ruptures, depending upon characteristics of the front cloth 4A, if the side cloth 4C is formed of a material that is likely to be torn. As a result, the air bag body 13 may expand out of the seat back 2 in an unexpected or undesirable direction.

If the side cloth 4C is formed of a material that has a tendency of stretching, the side cloth 4C also expands as the air bag body 13 deploys, and it may become difficult for the air bag body 13 to expand, outwardly of the seat back skin 4. Even if the air bag body 13 eventually expands outside the seat back skin 4, it may take a lot of time for the air bag body 13 to fully come out of the seat back, and the side air bag may not be able to exhibit sufficiently high shock-absorbing capability.

To enable the air bag body 13 to expand in a desired direction while rupturing a desired portion of the seat back skin 4, the characteristics (stretch, strength and others) of materials of the seat back skin 4, such as those of the side cloth 4C and front cloth 4A, must be taken into consideration. Also, an air-bag deployment test needs to be conducted each time the material characteristics of the seat back skin 4 are changed, which is time-consuming and results in an increased cost.

In some cases, the air bag body 13 may not expand from a desired location of the seat back skin 4 as expected, depending upon characteristics, such as stretch or strength, of the seat back skin 4. Thus, the material characteristics of the seat back skin 4 are limited, and the range of choices of materials used for the seat back skin 4 is undesirably narrowed.

SUMMARY OF THE INVENTION

The present invention has been developed in the light of the above-described situations. It is therefore an object of the invention to provide a seat with a side air bag, wherein the side air bag can be rapidly inflated from a desired position of a seat back skin with high reliability, while allowing the material of a seat back skin to be freely selected.

According to the present invention, there is provided a seat with a side air bag for a motor vehicle, comprising: an air bag module including an inflator and an air bag, the air bag module being incorporated in a seat back portion of the seat, the air bag being inflated to fill a space between an occupant and a wall in a compartment of the vehicle; a first skin member covering a side face of the seat back portion; a second skin member covering a front face of the seat back portion, the second skin member being sewed with one of opposite ends of the first skin member; and a reinforcing member provided on at least a part of a rear surface of the first skin member, for controlling a direction in which the air bag is inflated.

In the seat with a side air bag according to the present invention, the side air bag fulfills its requirements, namely, the air bag can surely and rapidly expand, when necessary, toward a desired location (where protection of an occupant is required), while assuring an appearance of the seat that is as good as a seat that is not provided with a side air bag, and allowing the material of the seat back skin to be freely selected.

BRIEF DESCRIPTION OF THE DRAWINGS

The invention will be described in greater detail with reference to preferred embodiments thereof and the accompanying drawings, wherein.

DETAILED DESCRIPTION OF THE PREFERRED EMBODIMENTS

Figure 1:
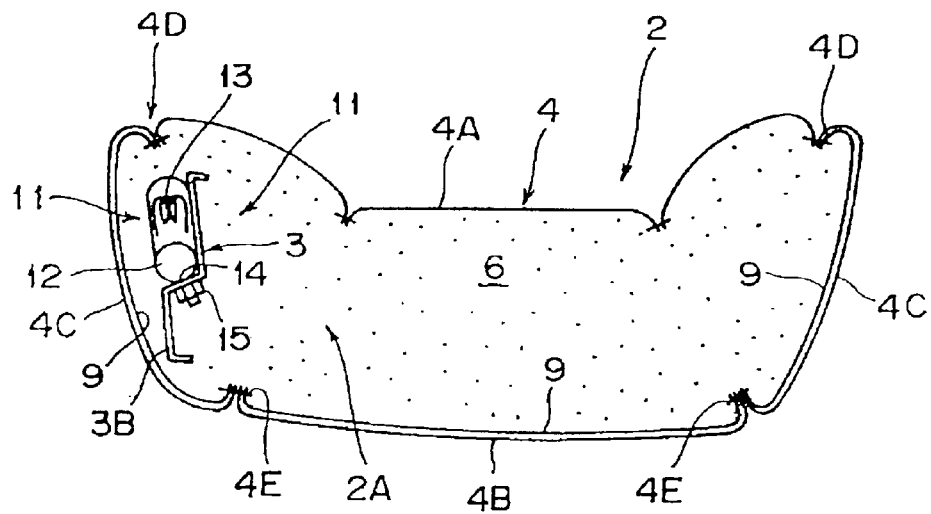
FIG. 1 is a cross-sectional view of a seat back of a seat with a side air bag according to the first embodiment of the present invention.

Preferred embodiments of the present invention will be described in detail referring to the drawings. FIG. 1–FIG. 4 show a seat with a side air bag according to the first embodiment of the present invention, and FIG. 5–FIG. 8 show a seat with a side air bag according to the second embodiment of the present invention.

The first embodiment of the present invention will be first explained with reference to FIG. 1 through FIG. 4. In the seat with the side air bag of the present embodiment, a seat back frame (hereinafter, simply called a "frame") 3 as a frame member is provided in a side portion 2A of the interior of a seat back portion (hereinafter, simply called a "seat back") of a seat 1 for an automobile, and a side air bag module (hereinafter, simply called an "air bag module") 11 is attached to this frame 3.

The frame 3 consists of a frame main body 3A that extends across the seat back 2 between right and left portions thereof, and an air bag module mounting bracket 3B (hereinafter, simply called a "mounting bracket") coupled to the frame main body 3A, which bracket serves as a member for mounting an air bag module in place and also serves as a side support member.

Figure 3:
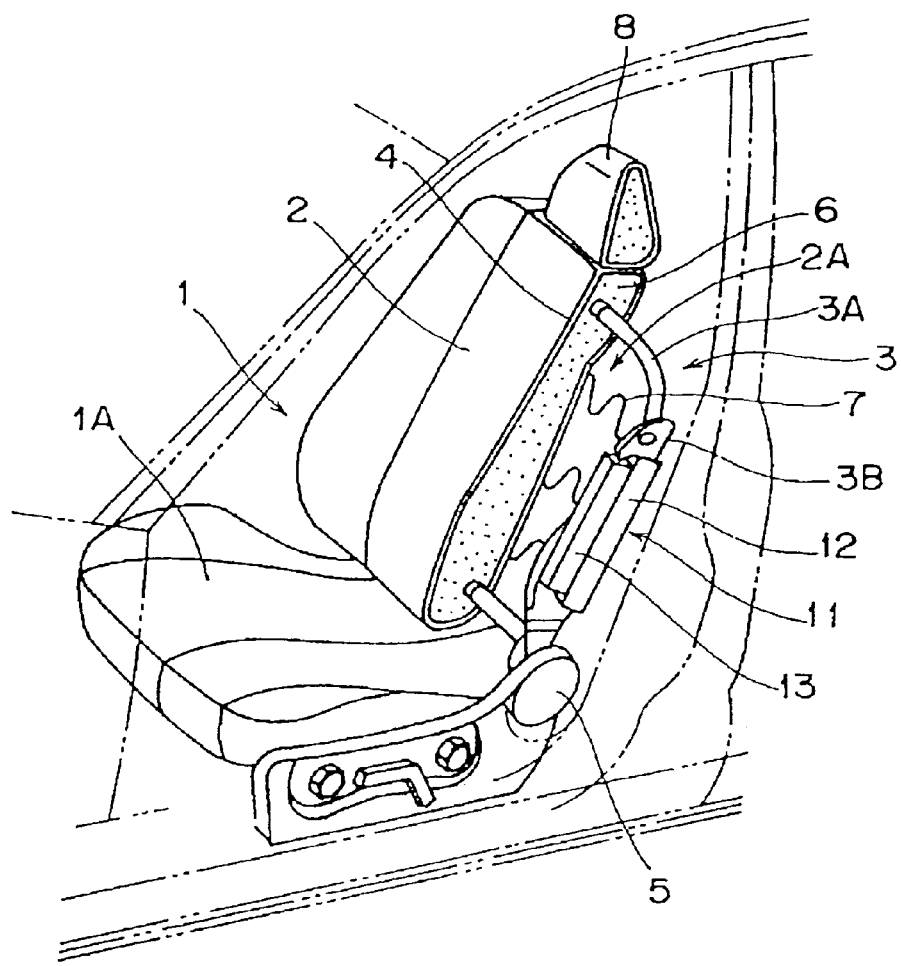
FIG. 3 is a perspective view showing the front face of the seat with the side air bag as the first embodiment of the invention, along with a partial cross section of the seat back.

Referring to FIG. 3, the seat 1 further includes a seat cushion 1A, a seat back skin 4, a hinge portion 5 for reclining the seat back 2, a cushion pad 6, a spring 7 incorporated in the cushion pad 6, and a head rest 8.

The seat with the side air bag of the present embodiment is used as a left-side seat of an automobile (passenger seat of a right-hand drive), and therefore the air bag module 11 is mounted on the left-hand side of the seat back 2. Similarly, a seat (not shown) used as a right-side seat (driver seat) may be constructed in symmetric relationship with that of the present embodiment, such that the air bag module 11 is mounted on the right-hand side of the seat back 2.

The air bag module 11 includes an inflator 12, and a folded air bag body (hereinafter, simply called an "air bag body") 13. During a side impact on the vehicle, a detonating agent (not shown) explodes, and gas is supplied from the inflator 12 into the air bag body 13 so that the air bag body 13 deploys and expands outward.

The mounting bracket 3B is a plate-like member that extends in the vertical direction of the seat back 2, and also extends in its front-to-rear direction, i.e., the direction of thickness of the seat back 2. The air bag module 11 is fixed to the outer side face of the mounting bracket 3B. More specifically, a mounting surface 14, on which the air bag module 11 is to be mounted, is formed at an outer side face of the mounting bracket 3B that approaches the surface of the seat back, and the air bag module 11 is fixed to this mounting surface 14 with a bolt and a nut 15, and thus positioned within the cushion pad 6.

In this arrangement, the frame main body 3A that forms the framework of the seat back 2, the mounting bracket 3B, and the side air bag module 11 are covered by the cushion pad 6 whose rigidity and thickness are controlled so that these components (3A, 3B, 1) are not felt or sensed by touching from the outside.

The air bag body 13, which is mounted on the outer side face of the mounting bracket 3B to face the outside and front of the vehicle body, tends to expand toward a portion of the seat back skin 4 that is located outwardly of and to the front of a portion of the vehicle where the air bag module 11 is installed. On the other hand, the cushion pad 6 having a large thickness, as well as the mounting bracket 3B, exists on the inner side (to the right in FIG. 1) of the vehicle body as viewed from the air bag body 13, and therefore the air bag body 13 is far less likely to expand in this direction.

As shown in FIG. 1, the seat back skin 4 includes a front cloth (second skin member) 4A that covers the front face of the cushion pad 6 on the front side of the seat (on the side of a seating surface), a back cloth (third skin member) 4B that covers the rear face of the cushion pad 6 on the back side of the seat, and a side cloth (first skin member) 4C that covers a side face of the cushion pad 6 of the seat. The front cloth 4A and side cloth 4C are sewed together to provide a seam 4D, and the side cloth 4C and back cloth 4B are sewed together to provide a seam 4E. The deploying air bag body 13 is desired to expand outward from the vicinity of the seam 4D between the front cloth 4A and side cloth 4C.

With the air bag body 13 positioned as described above, however, only a rough guide is provided for the deploying of the side air bag, and the precise position and direction of expansion of the air bag cannot be determined with certainty. In view of this, the seat of the present embodiment includes a guiding means as described below.

The air bag module 11 is disposed facing a portion of the seat back skin 4 (namely, side cloth 4C) that is located on the outer and front side of the vehicle body with respect to the module 11, and the air bag 13 is likely to expand toward this portion of the skin 4 (side cloth 4C). This arrangement, however, cannot ensure that the deploying air bag body 13 expand outward from the vicinity of the seam 4D between the side cloth 4C and front cloth 4A.

In the present embodiment, a reinforcing cloth 9 as a reinforcing member is attached to rear surfaces of the back cloth 4B and the side cloth 4C of the seat back skin 4, and this reinforcing cloth 9 performs a guiding function so that the air bag body 13 rapidly and surely expands from the seam 4D. This reinforcing cloth 9 is suitably formed of a cloth material that is unlikely to stretch and has a high strength. For example, a material used for the air bag body 13 may be used for the reinforcing cloth 9. In the present embodiment, the reinforcing cloth 9 is laminated on the rear surfaces of the back cloth 4B and the side cloth 4C, and sewed onto these cloths 4B, 4C at the seam 4E of the rear cloth 4B and side cloth 4C, and the seam 4D of the front cloth 4A and side cloth 4C, to be retained on the rear surfaces of these cloths.

Figure 2:
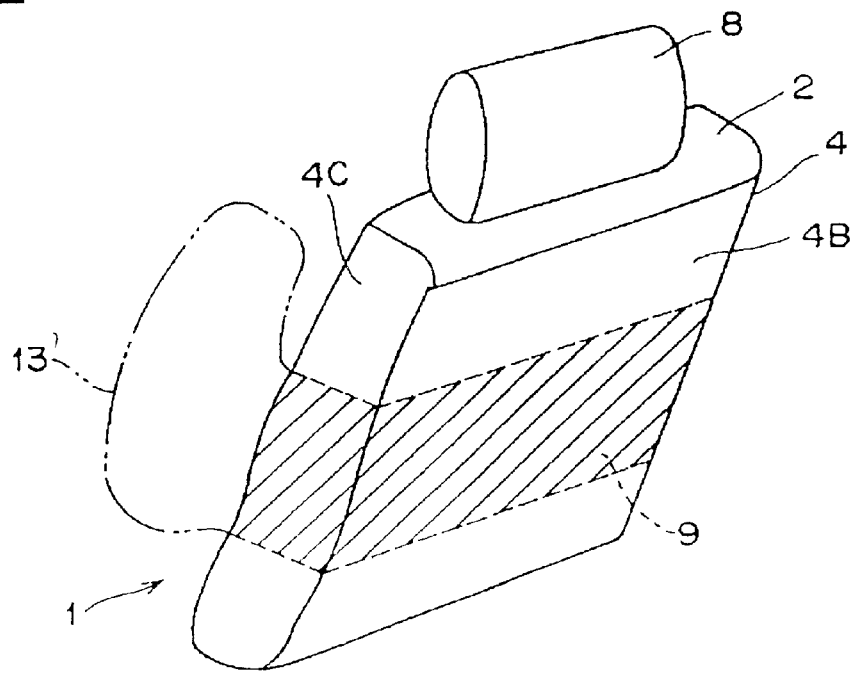
FIG. 2 is a perspective view showing the back face of the seat back of the seat with the side air bag as the first embodiment of the invention.

In the present embodiment, the reinforcing cloth 9 is only partially provided on necessary portions of the rear cloth 4B and side cloth 4C, namely, only on hatched areas bounded by broken lines in FIG. 2 which extend in the vertical direction over a certain length that corresponds to a location where the air bag body 13 is inflated. It is, however, to be understood that the reinforcing cloth 9 may be provided over the entire areas of the back cloth 4B and the side cloth 4C. In FIG. 2, an air bag that has been inflated is indicated by a chain line, and denoted by reference numeral 13'.

With the reinforcing cloth 9 thus provided, the air bag body 13 in the air bag module 11 deploys toward a side portion of the seat back skin 4 and is guided in a desired direction of expansion, without causing stretching or tearing of the side portion of the seat back skin 4 (where the side cloth 4C is provided) even if the side cloth 4C is made of a material that tends to stretch or has a relatively low strength.

In the above case, the deploying air bag body 13 is guided toward a portion of the seat at which stresses are concentrated due to deployment of the air bag body 13 and which has lower strength than other portions, or an edge of its portion reinforced by the reinforcing cloth 9, namely, toward the seam 4D between the front cloth 4A and side cloth 4C. Thus, the air bag body 13 is guided by the reinforcing cloth 9 and expands outwardly of the seat back skin 4 while breaking the seam 4D of the cloths 4A and 4C.

Although the seam 4E formed by the back cloth 4B and the side cloth 4C also suffers from stress concentration and has a lower strength than other portions, the air bag body 13 is unlikely to expand toward this seam 4E located on the side of the rear face of the seat back, because of the presence of the mounting bracket 3B and others. Thus, there is no possibility that the air bag body 13 expands outward through the seam 4E on the side of the rear face of the seat back, if the cloths 4B, 4C are securely sewed together.

Figure 4:
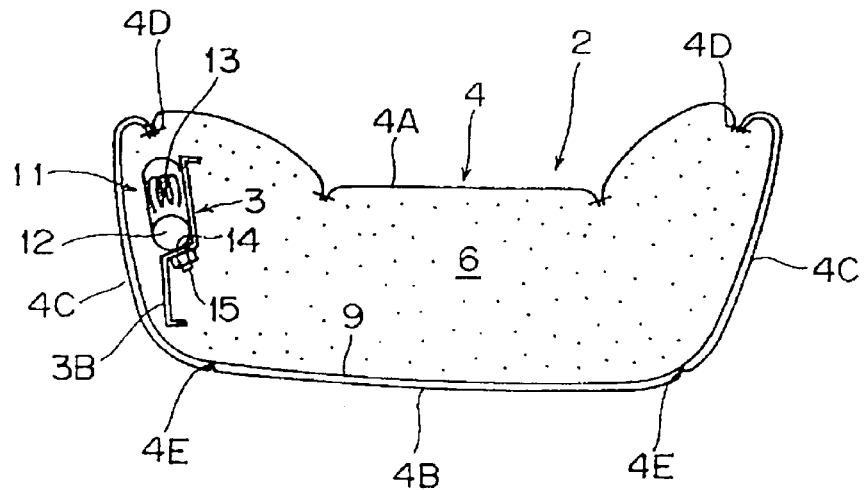
FIG. 4 is a cross-sectional view showing a modified example of the seat back of the seat with the side air bag as the first embodiment of FIG. 1.

As shown in FIG. 4, the reinforcing cloth 9 may be formed from a single sheet of cloth, and opposite edge portions of the reinforcing cloth 9 may be respectively sewed onto left and right seams 4D of the front cloth 4A and side cloths 4C. In this case, the seams 4E of the back cloth 4B and side cloths 4C are completely free from reduction in the strength. While the seat back skin 4 of the examples of FIGS. 1 and 4 is constructed so that it may be used for both right and left seats, in view of production efficiency, the reinforcing cloth 9 may be provided only on one side portion of the seat in which the air bag module 11 is mounted (left side portion of the seat back 2 in the example of FIG. 4), to cover only the rear surface of the side cloth 4C on this side (left-hand side in this example).

In the seat with the side air bag according to the first embodiment of the present invention as described above, the air bag module 11 is incorporated within the seat back 1, without requiring a lid or like member to be attached onto the surface of the seat back 1, thus assuring a seat surface condition similar to that of a seat back that is not provided with a side air bag. Also, the air bag body 13 of the air bag module 11 can be rapidly inflated at a desired location in a desired direction.

During a vehicle side impact, a detonating agent (not shown) explodes, and gas is supplied from the inflator 12 into the air bag body 13, so that the air bag body 13 deploys and expands outwardly of the seat. During the side impact, the air bag body 13 is likely to expand toward the front side of the side portion of the seat back 2, namely, toward the vehicle front side of a portion where the side cloth 4C is provided, due to the installation structure of the air bag module 11 and the presence of the mounting bracket 3B and others. Further, the air bag body 13 is guided by the reinforcing cloth 9 on the rear surface of the side cloth 4C, to expand outwardly through the seam 4D of the side cloth 4C and the front cloth 4A.

Namely, when the air bag body 13 deploys, stress concentration arises at the seam 4D that provides an edge of the reinforcing cloth 9, and the cushion pad 6 blows out to rapidly rupture the seam 4D that has a lower strength than its surrounding portions. As a result, the air bag body 13 expands outside the seat back skin 4 through the seam 4D.

The air bag body 13, when it expands outward through this seam 4D, instantly fills a space between the side body of the automobile and an occupant without fail so as to surely alleviate a shock caused by a collision between the side body and the occupant.

Thus, in the seat with the side air bag according to the present embodiment, the material for the skin of the seat back may be freely selected, and the side air bag certainly accomplishes its required functions, namely, the air bag is rapidly inflated when necessary, toward a desired portion of the vehicle (where protection of the occupant is needed), while assuring a good appearance of the seat back 2 similarly to a seat that is not provided with a side air bag.

Referring next to FIG. 5 through FIG. 8, the second embodiment of the present invention will be explained.

Figure 5:
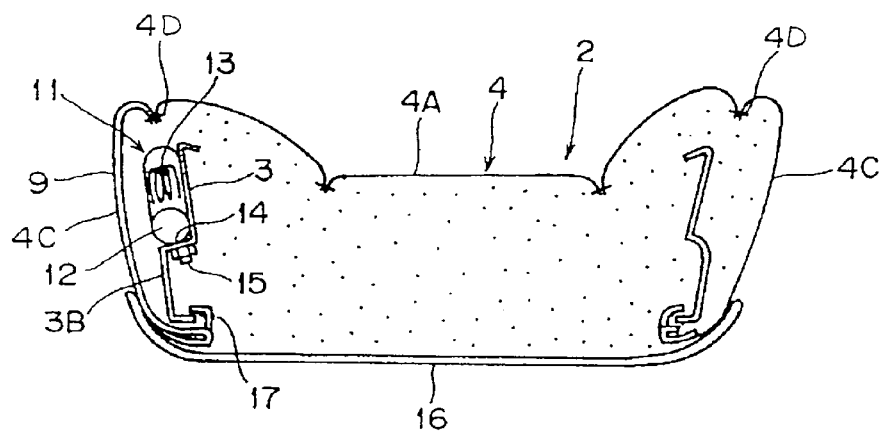
FIG. 5 is a cross-sectional view showing a seat back of a seat with a side air bag according to the second embodiment of the present invention.
Figure 6:
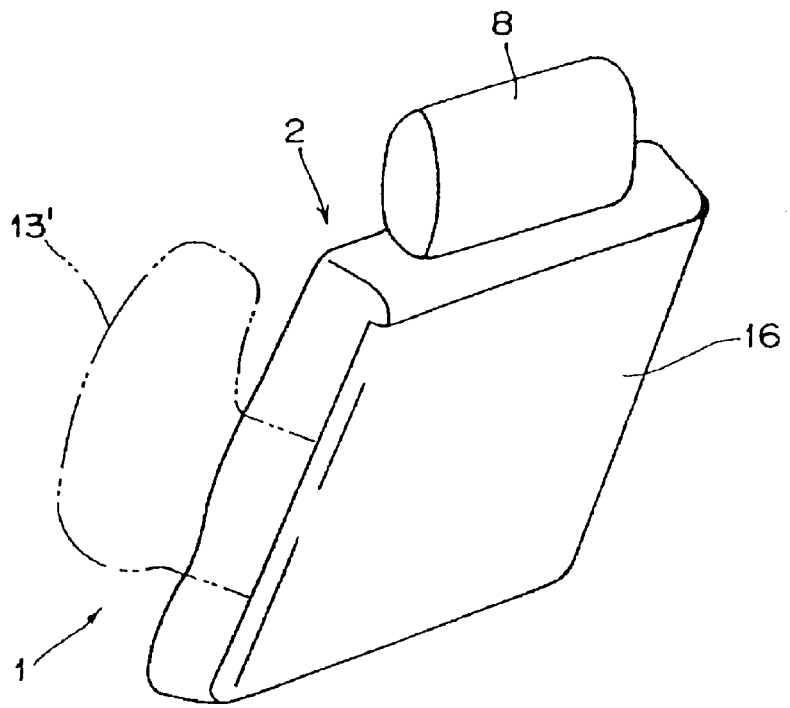
FIG. 6 is a perspective view showing the back face of the seat back of the seat with the side air bag as the second embodiment of the invention.

In the seat with a side air bag according to this embodiment, the rear surface of the seat back 2 is covered with a back-face member 16 made of resin, as shown in FIGS. 5 and 6. The seat back skin 4 consists of a front cloth (second skin member) 4A provided on the seating surface on the front side of the seat back, and side cloths (first skin member) 4C provided on opposite side faces of the seat back, as shown in FIG. 5, but does not include a back cloth on the rear side of the seat back. The back-face member 16 made of resin is provided in place of the back cloth.

The other basic construction of the seat back and the construction of the air bag module 11 incorporated in the seat back are similar to those of the first embodiment, and will not be explained herein. The air bag body 13 is likely to expand toward the outer and front side of the vehicle body, because of the installation structure of the air bag module 11 and the presence of the mounting bracket 3B and others.

In the present embodiment, a reinforcing cloth 9 is attached onto the rear surface of the side cloth 4C on one side of the seat back skin 4 at which the air bag module 11 is provided. The reinforcing cloth 9 serves as a reinforcing member for guiding expansion of the air bag body 11 out of the seat back skin 4.

This reinforcing cloth 9 is suitably made of a cloth material, such as that used for the air bag body 13, which is less likely to stretch and has a sufficiently high strength. In the present embodiment, one edge of the reinforcing cloth 9 is sewed onto a seam 4D formed between the front cloth 4A and side cloth 4C, to be integrated with each of the cloths, and the other end portion of this cloth 9 is hooked and fixed to one end of the mounting bracket 3B by means of a hook member 17. Namely, the reinforcing cloth 9 and the side cloth 4C are sewed together at one end portions thereof, and are fixed to the mounting bracket 3B at the other end portions thereof.

Figure 7:
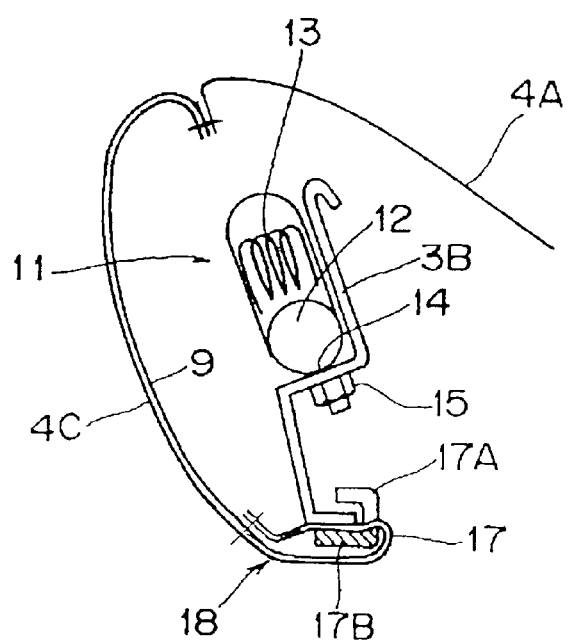
FIG. 7 is a cross-sectional view showing in enlargement a part of the seat back of the seat with the side air bag as the second embodiment of the invention.
Figure 8:
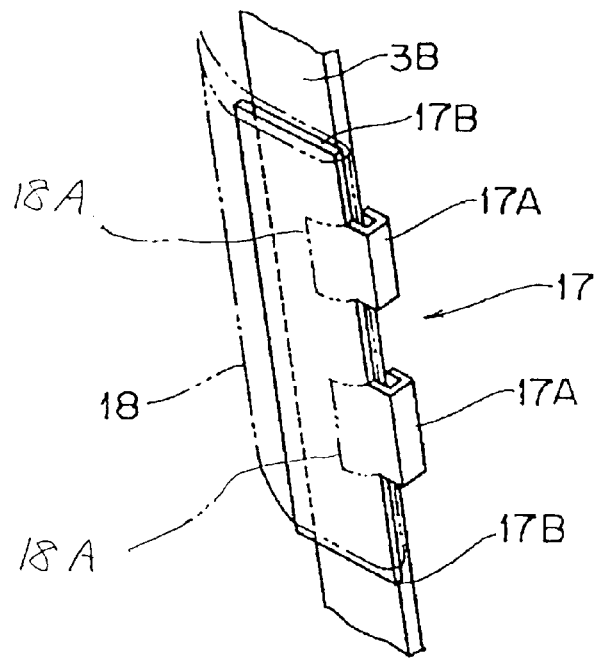
FIG. 8 is a perspective view showing in enlargement a part of the seat back of the seat with the side air bag as the second embodiment of the invention.
Figure 9:
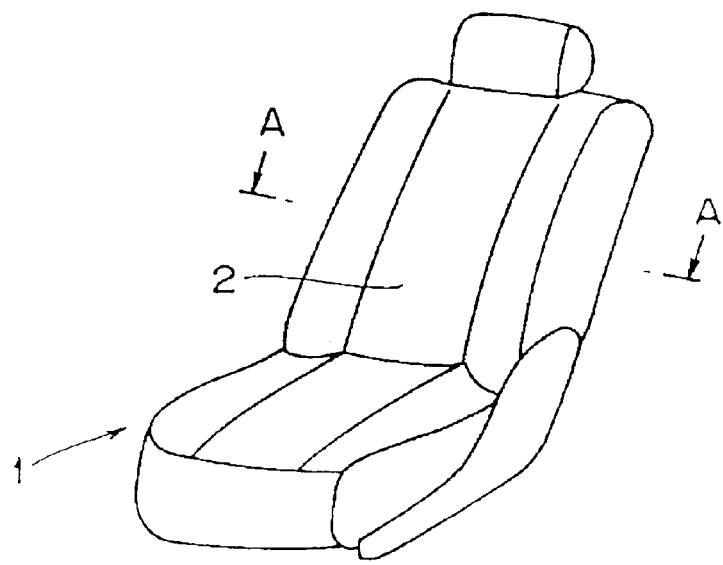
FIG. 9 is a perspective view showing a known example of seat with a side air bag.
Figure 10:
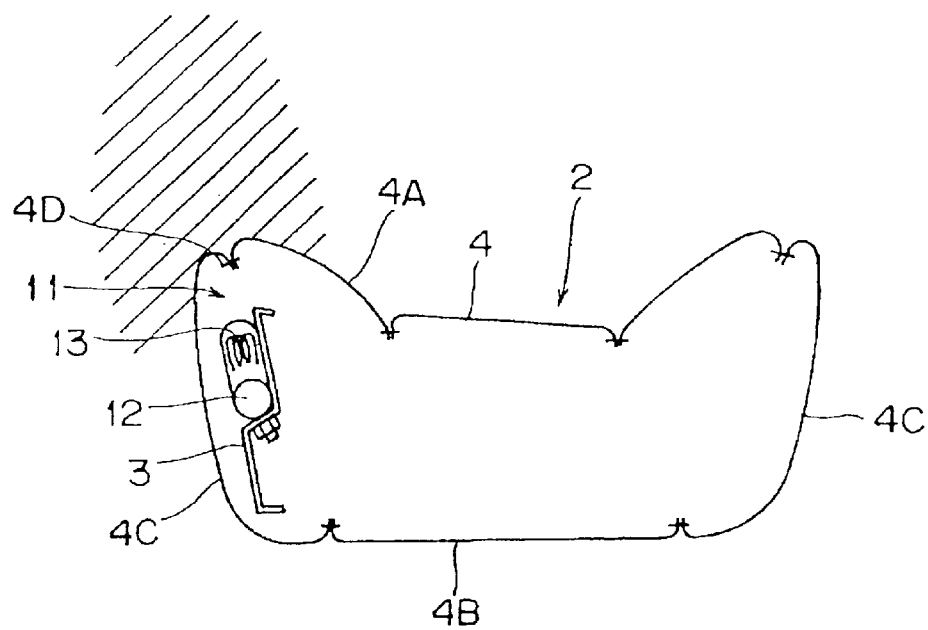
FIG. 10 is a cross-sectional view (as seen in the direction of arrow A—A in FIG. 9) showing the seat back of the known seat with a side air bag shown in FIG. 9.

As shown in FIG. 7 and FIG. 8, the hook member 17 includes an elongated engaging portion 17B that extends along an edge portion of the mounting bracket 3B, and hook portions 17A that have an L-shaped or U-shaped cross section and protrude from the engaging portion 17B. On the other hand, the above-indicated other end portions of the side cloth 4C and the reinforcing cloth 9 are superposed on each other, folded back, and then sewed together, to form a sleeve-like engaged portion 18. This engaged portion 18 wraps or surrounds the engaging portion 17B of the hook member 17, so that the hook member 17 and the other end portions of the side cloth 4C and reinforcing cloth 9 are connected to each other. The engaged portion 18 is formed with openings 18A through which the hook portions 17A protrude from the engaged portion 18 when the engaging portion 17B of the hook member 17 is wrapped by the engaged portion 18.

When the other end portions of the side cloth 4C and reinforcing cloth 9 are engaged with the mounting bracket 3B, the engaging portion 17B of the hook member 17 is inserted into a sleeve-like portion of the engaged portion 18, and the hook portions 17A are projected out of the engaged portion 18 through the openings 18A. Subsequently, one edge of the mounting bracket 3B is brought into engagement with the engaged portion 18 and engaging portion 17B by means of the hook portions 17A. In this manner, the other end portions of the side cloth 4C and the reinforcing cloth 9 are fixed to the mounting bracket 3B.

Since the back-face resin member 16 is attached to the back face of the seat back to completely cover the mounting bracket 3B and its vicinity, and also contact with the side cloth 4C with no clearance therebetween, a portion of the seat back where the other end portions of the side cloth 4C and reinforcing cloth 9 are fixed to the mounting bracket 3B is covered by the back-face resin member 16, whereby the back face of the seat back assures a good appearance.

In the seat with the side air bag according to the second embodiment of the invention, the air bag body 13 deploys and expands out during a side impact on the vehicle, toward the front side of a side portion of the seat back 2, namely, toward the vehicle front side of a portion where the side cloth 4C is provided, due to the installation structure of the air bag module 11 and the presence of the mounting bracket 3B and others. Further, the air bag body 13 is guided by the reinforcing cloth 9 on the rear surface of the side cloth 4C, to expand outwardly through the seam 4D.

Namely, when the air bag body 13 deploys, stress concentration arises at the seam 4D that provides an edge of the reinforcing cloth 9, and the seam 4D having a lower strength than its surrounding portions rapidly raptures, whereby the air bag body 13 expands outwardly of the seat back skin 4 through the seam 4D. The air bag body 13, when it expands outwards through this seam 4D, instantly fills a space between the side body of the automobile and the occupant without fail, so as to surely alleviate a shock caused by a collision between the side body and the occupant.

Thus, in the seat with the side air bag according to the present embodiment, the side air bag is able to surely accomplish its required functions, namely, the air bag rapidly deploys when necessary, and expands toward a desired portion (where protection of the occupant is needed), while assuring a good appearance of the seat back 2 similarly to a seat that is not provided with a side air bag.

In the second embodiment, the process of manufacturing the seat can be simplified due to the use of the back-face resin member 16, and the side cloth 4C and reinforcing cloth 9 can be easily attached to the mounting bracket 3 by using the hook member 17.

In both of the illustrated embodiments, end portions of the side cloth (first skin member) 4C on the side face of the seat and the front cloth (second skin member) 4A on the front side (seating surface) of the seat are sewed together, and the reinforcing cloth (reinforcing member) 9 is provided on a necessary portion (that faces the air bag body 13 at least during its expansion) of the rear surface of the side cloth 4C, so that the air bag body 13 can rapidly and surely expands outward through the seam 4D of the side cloth 4C and front cloth 4A when needed, thereby to ensure protection of the occupant.

While the reinforcing cloth (reinforcing member) 9 may be suitably formed of a material used for the air bag body 13, for example, any other cloth material may be used provided that it is unlikely to stretch and has a sufficiently high strength. Also, the reinforcing member is not necessarily formed of a cloth material, but may be a sheet-like member, such as a film, that is unlikely to stretch and has a high strength. In addition to small stretch and high strength, it is also preferable that the material of the reinforcing member has high compatibility with that of the seat back skin, and does not affect the feeling of the seat back during use.

While the seats used in automobiles have been described by way of example in the illustrated embodiments, the present invention is equally applicable to seats used in any type of vehicle provided the seat is effectively provided with a side air bag.

What is claimed is:

1. A seat with a side air bag for a motor vehicle, comprising:

an air bag module including an inflator and an air bag, said air bag module being incorporated into a seat back portion of the seat, said air bag being inflated to fill a space between an occupant and a compartment of the vehicle;

a cushion member covering at least said air bag module;

a first skin member covering a side face of said cushion member;

a second skin member covering a front face of said cushion member, said second skin member being sewed to a first end of said first skin member;

a reinforcing member provided between said cushion member and said first skin member and on at least a part of an inner surface of said first skin member, for controlling a direction in which said air bag expands out of said seat back portion.

2. The seat with a side air bag according to claim 1, wherein said reinforcing member is provided in a portion of said inner surface of said first skin member which faces said air bag during expansion of the air bag.

3. The seat with a side air bag according to claim 2, wherein said seat back portion includes a frame member provided in a side portion of the seat back portion, and a bracket attached to said frame member, and wherein said air bag module is mounted on one side of said bracket which faces said first skin member.

4. The seat with a side air bag according to claim 1, wherein said reinforcing member includes a cloth.

5. The seat with a side air bag according to claim 1, further comprising:

a third skin member sewed to a second end of said first skin member opposite said first end, for covering a back face of said seat back portion, wherein a first end of said reinforcing member is sewed to an end portion of said second skin member, and a second end of said reinforcing member is sewed to an end portion of said third skin member.

6. The seat with a side air bag according to claim 1, further comprising:

a back panel which covers a back face of said seat back portion, said first skin member being in contact with said back panel with no clearance therebetween.

7. The seat with a side air bag according to claim 6, wherein said seat back portion includes a frame member provided in a side portion of the seat back portion, and a bracket attached to said frame member, wherein said air bag module is mounted on one side of said bracket which faces said first skin member; and wherein said back panel covers said bracket.

8. The seat with a side air bag according to claim 1, further comprising:

a third skin member which covers a back face of said seat back portion, said reinforcing member extending over inner surfaces of said first skin member and said third skin member.

9. The seat with a side air bag according to claim 8, wherein said reinforcing member includes a single sheet of cloth.

10. The seat with a side air bag according to claim 1, wherein said seat back portion includes a frame member provided in a side portion of said seat back portion, wherein said reinforcing member extends from said first end of said first skin member to a second end thereof opposite said first end, said reinforcing member having a first end corresponding to said first end of said first skin member, and a second end corresponding to said second end of said first skin member; and wherein said second end of said first skin member and said second end of said reinforcing member are fixed to said frame member.

11. The seat with a side air bag according to claim 10, further comprising;

a hook member attached to said second end of said first skin member and said second end of said reinforcing member, for engaging with the first skin member and the reinforcing member.

12. The seat with a side air bag according to claim 11, wherein said first skin member and said reinforcing member cooperate with each other to provide a sleeve-like engaged portion that surrounds said hook member, said engaged portion being formed by folding and sewing together said second end of said first skin member and said second end of said reinforcing member.

13. The seat with a side air bag according to claim 12, wherein said hook member includes an engaging portion that extends along said frame member, and at least one hook portion that engages with said frame member, said sleeve-like engaged portion having at least one opening through which said at least one hook portion protrudes when said engaging portion is surrounded by said sleeve-like engaged portion.

14. The seat with a side air bag according to claim 11, wherein said frame member is provided with a bracket on which said air bag module being mounted, and wherein said hook member engages with said bracket.

15. The seat with a side air bag according to claim 11, wherein said air bag deploys from said seat by tearing the portion where said second skin member is sewn to said first end of said first skin member.

16. A side impact air bag for a motor vehicle, comprising:

a seat back cushion member;

an air bag module disposed inside said seat back cushion member circumjacent to a side of said seat back cushion member, said air bag module including an inflator and an air bag;

a first skin member covering said side of said seat back cushion member; and a reinforcement member, provided between said cushion member and said first skin member, for covering and reinforcing at least a part of said side of said seat back cushion to direct said air bag to inflate in a desired direction.

17. The side impact air bag of claim 16, further comprising:

a second skin member covering a front face of said seat back cushion member and sewn to a first end of said skin member such that said air bag deploys from said seat back cushion member by tearing the portion where said second skin member is sewn to said first end of said first skin member, wherein said reinforcement member being provided on an inner surface of said first skin member.

18. A seat with a side impact air bag, comprising:

a seat back cushion member;

an air bag module disposed inside said seat back cushion member circumjacent to a side of said seat back cushion member;

a first skin member covering said side of said seat back cushion member;

a second skin member connected to said first skin member for covering a back face of said seat back cushion member; and a reinforcement member provided between said first and second skin members and said cushion member to direct said air bag to inflate in a desired direction.

* * * * *